3,281,599
MUD-CAKE-THICKNESS MEASURING DEVICE FOR GAMMA-GAMMA DENSITY LOGGER

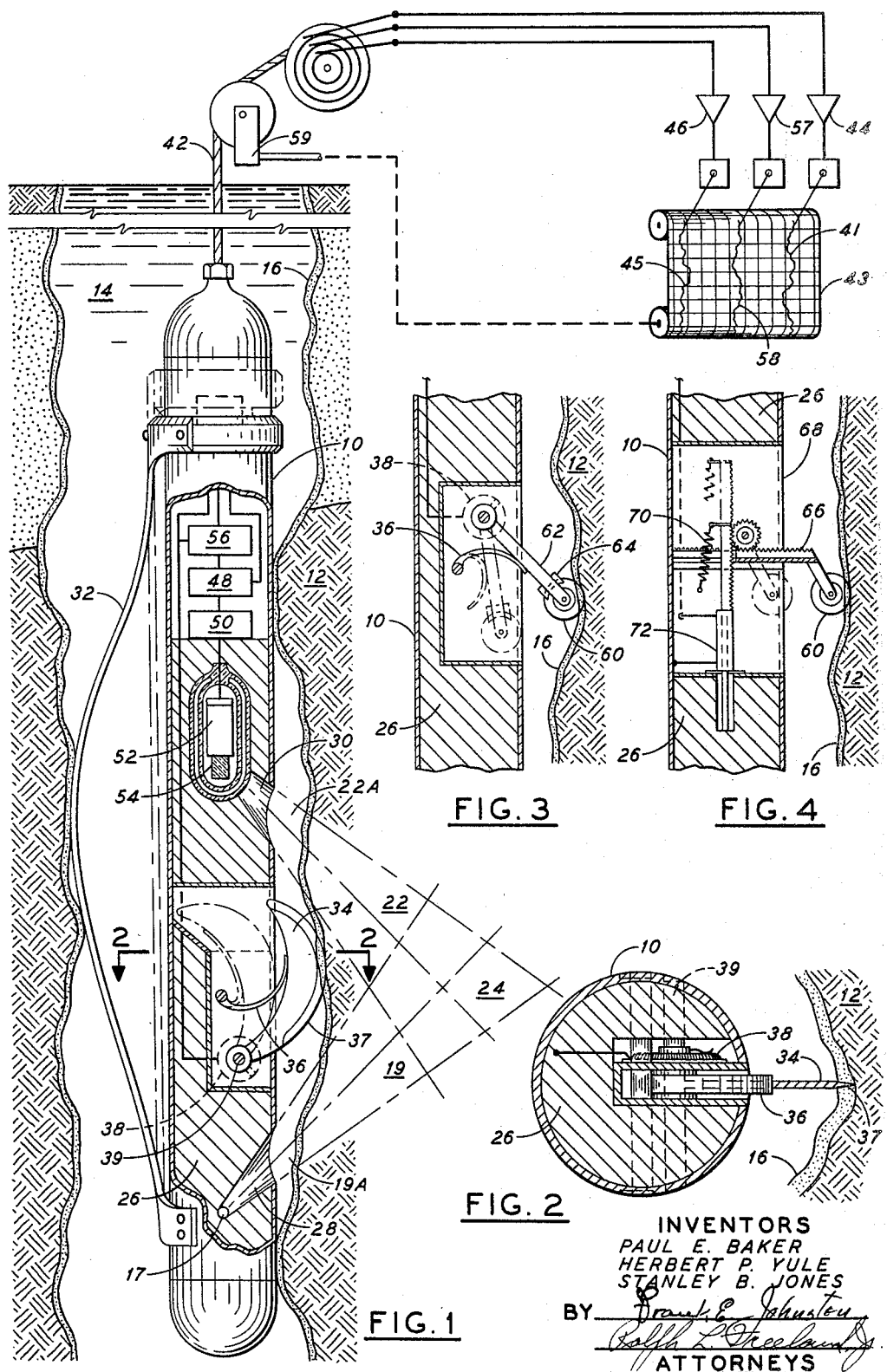

Paul E. Baker and Herbert P. Yule, Anaheim, and Stanley B. Jones, Whittier, Calif., assignors to Chevron Research Company, a corporation of Delaware
Filed Aug. 25, 1959, Ser. No. 835,951
8 Claims. (Cl. 250—83.3)

The present invention relates to density logging by the gamma-ray irradiation of an earth formation and the detection of back-scattered gamma-ray radiation. More particularly, the invention relates to a method of logging true bulk density of an earth formation traveresd by a well bore by the gamma-gamma method of radiation detection by permitting compensation to be made for the inclusion of mud cake lying directly between and in the path of a collimated beam of gamma radiation and the returning collimated beam of back-scattered gamma radiation which penetrates only a definite and prescribed portion of the well bore, so that localized caving or roughness of the borehole can be accounted for to record true bulk density of the formation.

In the copending application of Paul E. Baker and Stanley B. Jones, Serial No. 349,491, filed April 17, 1953, also assigned to the assignee of the present invention and now abandoned, there is described a method of density logging of earth formations traveresed by a well bore. In said method, a particular part of the earth formation is irradiated by a collimated source of substantially monoenergetic gamma radiation, such as that emitted by a cesium 137 or cobalt 60 source. A further collimated path for back-scattered gamma radiation directs only gamma radiation that has been back-scattered within a prescribed volume lying within the earth formation into a scintillation detector. In order to exclude as much drilling fluid from the path between the collimated source of gamma radiation and the collimated return path, a bowspring forces the opposite side of the logging sonde away from the well bore and the collimator openings in direct contact with the side of the borehole where the measurement is to be made. It is desirable that the side of the logging sonde be relatively smooth, that is, an elongated cylinder or ellipsoid, so that the tool will readily pass through the well bore both while being lowered into the hole and when pulled out. Unfortunately, oil well boreholes are seldom smooth or to caliper. Accordingly, the roughness of the well bore created by drilling, and sometimes caving along the well bore wall after drilling, permits more than a desirable amount of the mud cake and drilling fluid to be bridged by such an elongated cylindrical logging tool. Bridging over of these minor variations in borehole diameter includes an unknown and undefined amount of mud cake and drilling fluid in the critical scattering and irradiation paths for gamma rays passing from the source into the formation and back to the detector. Accordingly, it has been necessary to run a caliper log of the well bore in order to make a proper evaluation of the gamma-radiation intensity and correct such intensities to read in terms of true bulk density. While an independent caliper log can be run in the well bore, the cost of an additional log of this type frequently makes running the gamma-gamma log for density determination unattractive. Further, a conventional three-caliper-arm tool, normally used for detecting caliper of a well bore, is difficult to operate and inaccurate in its measurement unless the supporting tool is centralized in the well bore. The present invention is directed to a "side-hole riding" instrument and, of course, it cannot be centralized without detracting from the accuracy that is desired and greatly enhanced by forcing the tool to ride along the side of the well bore. Additionally, the critical part of the mud-cake thickness and caving or other irregularities of the side wall are most important in the area directly between the collimators for the detector and the radiation source. Hence, an independent caliper log that does not define the roughness or irregularities of the borehole directly in that path where the radiation measurements are made is not particularly accurate for purposes of correcting the gamma-radiation log.

For the foregoing reasons, there is provided in accordance with the present invention an apparatus for detecting the caving or irregularities in the well bore directly in the path between the source and the detector of a logging sonde adapted to ride the side of the well bore. In accordance with said invention, a feeler member is interposed between the source and the detector. This feeler member is biased toward the side of the borehole so that its outer end includes a knife edge adapted to penetrate the mud cake and directly contact the rock forming the side wall of the borehole. The feeler member is spring-biased to maintain this contact with the side wall of the well bore, and means are provided for measuring the deflection of the outer end of the feeler member relative to the body portion of the logging sonde. In this way there is simultaneously detected the amount of deviation from a smooth, cylindrical well bore and the mud cake directly in the path of the gamma rays penetrating the earth formation whose density is to be detected. Desirably, but not necessarily, the detected position of the knife edge is used to automatically compensate the density-log reading so that when it is recorded at the earth's surface in accordance with the depth of the instrument there is indicated directly the true bulk density of the earth formation without requiring correction for the mud cake and drilling fluid lying in the path of the detected gamma radiation.

Further objects and advantages of the present invention will become apparent from the following detailed description taken in conjunction with the accompanying drawings which form an integral part of the present specification.

In the drawings:

FIG. 1 is a perspective view in vertical section of a density logger constructed in accordance with the present invention including a schematic representation of the automatic compensation for variations in the side wall irregularities between the source and detector collimators.

FIG. 2 is a cross-sectional plan view of the feeler member taken in the direction of arrows 2—2 in FIG. 1.

FIG. 3 is an alternative arrangement of a feeler member useful in the arrangement of FIG. 1.

FIG. 4 is a further modification of the feeler member illustrated in FIGS. 1 and 3, including an alternative apparatus for detecting the position of the feeler member.

Referring now to the drawings and in particular to FIG. 1, there is shown a logging sonde 10 of the type contemplated by the present invention for investigating bulk density of the earth formation 12 traversed by a normally irregular borehole 14. The irregularities of the borehole 14 are indicated by caving or other defects in the smoothness of the borehole created by the drilling operation and softening of the rock by drilling fluid. As indicated, borehole 14 has a mud cake 16 that has thicknesses of up to about 2 inches and prevents loss of drilling fluid into formation 12 during the drilling operation. However, where irregularties of the type shown in FIG. 1 occur, the mud and/or mud cake may be several inches or more thick, and where the elongated sonde 10 is as long as indicated the irregularities are bridged by the sonde itself. Such irregularities or voids, of course, can be a significant part of the total path for gamma rays originating in a gamma-ray source, such as those coming from capsule source 17. The area within space 19 indicates all of the volume of the formation irradiated by gamma-ray source 17. Due to the proximity of the portion 19A, which represents the mud cake and drilling fluid in this path, it will be seen in the present example that this portion represents a significant part of the direct irradiation path. For the same reasons, scintillation detector crystal 54, which is arranged to detect gamma rays back-scattered primarily from the region identified as space 22, includes as a significant part thereof the mud portion identified as 22A. The critical scattering volume is identified as 24, that is, the part that intercepts the space common to areas 22 and 19.

The method by which the critical scattering volume 24 is defined is more thoroughly disclosed in application Serial No. 349,491 of Stanley B. Jones and Paul E. Baker, coinventors of the present application. As there set forth, this critical scattering volume is primarily defined by the collimation provided by shielding 26 which surrounds a monoenergetic gamma-ray source 17 and scintillation detector crystal 54 and the openings formed therein, 28 and 30, respectively, for source 17 and crystal 54. The setting of discriminator or gate 50 also helps to define this critical scattering volume. As further pointed out in said application, it is essential that logging sonde 10 be forced against the side of the well bore so that it contacts mud cake 16 as closely as possible. For this purpose, bowspring 32 urges logging sonde 10 against one side of the borehole by exerting pressure against the diametrically opposed surface of the borehole. Source 17 is suitably an encapsulated form of cobalt 60 or cesium 137.

Because logging sonde 10 must ride against the side of the well bore through the action of bowspring 32 and for superior results that are derived from collimation of both the gamma-ray source and the returning gamma radiation, a normal caliper run, made with a conventional three-caliper-arm tool that is centralized, cannot be used on the same run with the present instrument. Additionally, even if an independent run of a caliper log is made, the results so obtained are not definitive of the exact amount of drilling fluid and mud cake contained in the critical area for scatter and irradiation of the gamma rays through collimators 28 and 30. For this reason, there is provided in accordance with the present invention means for measuring and compensating the readings obtained with the density log by measuring that portion of the drilling fluid and mud cake included in the irregularities of the well bore directly between the collimators 28 and 30. In accordance with said concept, FIG. 1 illustrates a scimitar-shaped knife blade 34 that serves as a feeler member between the source and detector. This feeler member is biased by a spring 36 to ride the surface of the well bore directly between the collimator means. Preferably the feeler member, as in the present embodiment, includes a knife-like surface, or edge, 37, so that mud cake 16 will be penetrated independently of the thickness thereof, and edge 37 will directly contact the rocks forming formation 12. Further, in accordance with the embodiment of FIG. 1, the deflection of the feeler means toward the side of the well bore is measured by a potentiometer 38 placed at the pivot point 39 of scimitar blade 34. With potentiometer 38 energized and the output thereof being variable with the deflection of scimitar blade 34, the irregularity of the borehole may be directly recorded at the earth's surface. This is indicated by the line graph 41 on record chart 43 at the earth's surface. The recorder, of course, is interconnected with potentiometer, or rheostat, 38 by logging cable 42 and suitable amplifying means, indicated generally as 44.

With such an arrangement, an apparent bulk density log is traced as line graph 45 by similar amplifier 46 receiving its output over another line of cable 42 and from counting rate circuit 48 within logging sonde 10.

The input to counting rate circuit 48 is controlled by the amplifier and gate 50 which in part may be used to control and define the critical scattering volume 24 by discrimination to a narrow band pass in the method outlined in application Serial No. 349,491. The input to amplifier and gate 50 is, of course, from the scintillation counter which includes photomultiplier tube 52 and crystal 54. The latter is preferably sodium iodide, thallium activated.

If desired, and as illustrated in FIG. 1, the compensation of the density-log reading appearing on graph 45 may be made automatically to compensate for variations and irregularities in the mud cake by an electronic correction unit, designated as 56. Where this unit is in the circuit, the mud-cake thickness graph 41 may be omitted if desired. However, for purposes of checking the operation of the circuit, it is useful for all of the units to be recording and that the output of the corrected signal be recorded as a separate trace, designated generally as 58. The location of correction unit 56 is not critical to the present embodiment. It may be located at the earth's surface. Whether down hole or up hole, the input to both the density log and the deflection measuring means can generate the desired corrected graph 58. However, in the present embodiment, correction unit 56 is shown as being located within the logging sonde, and the signal is transmitted over the logging cable 42 in the same manner as the output of the density measurement 41 or caliper 45 on graph 43.

The function of the electronic correction unit 56 is best defined by the mathematical correction that is automatically imposed by the output of the feeler measuring device. In said unit, electrical signal output is proportional to the true bulk density designated as $P_B$. This value is derived from the measured apparent bulk density and a measurement of the mud-cake thickness by feeler member 34. The density of the drilling fluid also enters into this measurement and must be established for each drilling mud for the borehole wherein the tool is operated. The following equation indicates the method of correcting to true bulk density that is made by unit 56:

$$P_B \approx P_A - K1 P_M$$

The designation $P_A$ represents the apparent density, $P_M$ represents the density of the mud, 1 represents the thickness of the mud cake, and K is the instrument constant.

From the foregoing equation, it will be apparent that a single measurement of the void volume of the gamma-ray path, as derived from a single feeler means, requires some instrument compensation for the fact that the measurement is made intermediate the actual paths of the gamma-ray-source collimated beam and the collimated beam of back-scattered gamma rays. Such correction, however, can be made automatically by displacement of the corrected record on graph 43, because logging sonde 10 is normally moved at a constant rate, and relatively slowly, of about 30 feet per minute, and the recording of the gamma-radiation intensity is made by a counting rate meter which in fact integrates the total counting rate of over a foot or so of formation. Where the collimators have a spacing between their openings of about one foot, the average thickness of the irregularity in the borehole, as measured by the feeler member 34, will be of the same order of magnitude as the thickness of mud included between the source and detector collimating openings.

FIG. 3 represents an alternative feeler member for detecting the irregularities of the borehole. As there shown, a rotatable wheel 60 is carried on the end of a pivoted arm 62 that is biased by spring means 36. The position of arm 62 and the wheel 60 along the side of the well bore is, of course, detected in a manner similar to that described in FIG. 1. Namely, the pivotal motion of arm 62 can be detected by any suitable rheostat or potentiometer 38. It is, of course, the lateral motion of arm 62 which controls the output of potentiometer 38. As further indicated in FIG. 2, a wiper member 64 may be included as a part of arm 62 so that upon rotation of wheel 60 any mud cake that may tend to adhere to the wheel 60 will be wiped away as the wheel rolls up the side of well bore 14 through mud cake 16.

FIG. 4 illustrates a further embodiment of a feeler member as contemplated by the present invention, and also incorporates a wheel 60 that is moved laterally relative to the side wall of logging sonde 10. However, in the present embodiment, wheel 60 is supported upon a laterally extendible and retractable arm 66 that passes through a hole 68 in the side wall of logging sonde 10. A spring member 70 forces the shaft 66 and wheel 60 into firm engagement with the side wall of the borehole. The position of arm 66 and wheel 60 relative to the side wall is detected by an induction coil 72 that includes as a core a vertical extension of arm 66 that is connected to the horizontal section through a rack and pinion connection. If desired, spring means 70 can be eliminated from the apparatus and the solenoidal action of the coil 72 can be used as the means for biasing arm 66 and wheel 60 into contact with the well bore wall. The electrical current passing through the coil 72, of course, will be a measure of the position of the core within the coil itself.

From the foregoing description it will be seen that there is provided by the present invention an improved method of compensating for mud cake and mud-cake thickness lying directly in the path of a collimated beam of gamma rays used to irradiate an earth formation for detecting its bulk density. In accordance with said concept, a feeler member biased toward the edge of the borehole intermediate the collimators for the detector and the source, respectively, provides a means for automatically modulating the output of the density log gamma-radiation detector in accordance with position of said feeler means, so that there is recorded directly the true bulk density of the earth formation.

As is well understood in the art of well logging, the means for recording the gamma-radiation intensity representing the apparent bulk density, as well as the corrected output as compensated by the caliper for irregularity of the borehole, whether recorded directly on the graph or as a true bulk density, is made in accordance with the depth of the logging sonde or any other reference point thereon in the well bore through cable-driven depth indicator 59 which mechanically drives record chart 43.

Various changes and modifications in the foregoing arrangement can be made within the skill of the art without departing from the invention. All such modifications and changes falling within the scope of the appended claims are intended to be included therein.

We claim:

1. In a logging sonde for investigating the bulk density of an earth formation traversed by an irregular borehole and wherein said sonde includes a body portion containing a gamma-radiation source, gamma-radiation detecting means spaced a predetermined distance from said source, shielding means between said source and detector, collimating means for restricting both the path of said gamma radiation entering into and returning from said formation and spring means secured to said body portion for urging said sonde into engagement with the same side of said borehole to which said collimating means are directed, the improvement for determining the irregularities of said borehole lying directly between said detector collimating means and said source collimating means comprising a scimitar-shaped knife blade pivotally supported at one end between said source and said detector, the other end of said blade including a knife edge for penetrating the mud cake on the side wall of said borehole, additional spring means for biasing said edge of said knife blade toward the rock forming the side wall of said borehole and toward the same side as said sonde is biased by said body urging spring means, means for measuring the pivotal deflection of said knife blade relative to the body portion of said logging sonde, means for converting said pivotal deflection of said blade to an electrical signal representative of said deflection of said scimitar blade through said mud cake, and means for simultaneously recording said signal at the earth's surface as a direct indication of said irregularities of said borehole lying directly between said detector collimating means and said source collimating means.

2. In a logging sonde for investigating the bulk density of an earth formation traversed by an irregular borehole and wherein said sonde includes a body portion containing a gamma-radiation source, gamma-radiation detecting means spaced a predetermined distance from said source, shielding means between said source and detector, collimating means for restricting both the path of said gamma radiation entering into and returning from said formation and spring means secured to said body portion for urging said sonde into engagement with the same side of said borehole to which said collimating means is directed, the improvement for determining the irregularities of said borehole lying directly between said detector collimating means and said source collimating means comprising an arm member movable laterally relative to said body portion of said logging sonde and interposed between said source and said detector, spring means for biasing the outer end of said arm member toward the rock forming the side wall of said borehole and toward the same side of said borehole as said sonde, said outer end of said arm member supporting a rotatable wheel thereon, a knife edge formed around the periphery of said wheel for rolling penetration of the mud cake on the side wall of said borehole, means for measuring the deflection of said arm member relative to the body portion of said logging sonde, and means for simultaneously recording said measurement at the earth's surface as a direct indication of said irregularities of said borehole lying directly between said detector collimating means and said source collimating means.

3. Apparatus in accordance with claim 2, wherein said arm member includes means to support said arm member for slidable motion transverse to the axis of said body portion of said logging sonde and said transverse motion is detected by movement of said support for said arm member into and out of an induction coil.

4. Apparatus in accordance with claim 2, wherein said arm member for supporting said rolling knife edge includes means for wiping the edge of said knife blade as said wheel rotates in contact with said well bore wall.

5. Apparatus in accordance with claim 3, wherein said transversely movable arm member is biased toward the side walls of said borehole by an electrical current passing through said induction coil and the deflection thereof is detected by a change in the electrical current flow through said coil.

6. Logging apparatus for recording the true bulk density of an earth formation traversed by an irregular borehole independent of drilling mud and mud cake included in the irregular sidewall of the borehole through which the apparent bulk density of said formation is measured comprising a sonde including a body portion containing a gamma-radiation source, gamma-radiation detecting means spaced a predetermined distance from said source, shielding means between said source and detector, collimating means for restricting both the path of said gamma radiation entering into and returning from said formation and spring means secured to said body portion for urging said sonde into engagement with the same side of said borehole to which said collimating means is directed, a feeler member interposed between said source and said detector, said feeler member being biased toward same side of said borehole as said sonde is biased by its spring means, the outer edge of said feeler member including a knife edge for penetrating the mud cake in the side wall of said borehole, spring means for biasing said feeler member toward the rock forming said side wall, and means for measuring the deflection of said feeler member relative to the body portion of said logging sonde, means for modulating the output of said density-log gamma-radiation detector in accordance with the position of said feeler member in an amount and in a direction to compensate for the drilling mud and mud cake in the path of gamma radiation passing from said source into said formation and returning to said detector, and means for recording said modulated gamma-radiation intensity in accordance with the depth of said logging sonde in said well bore.

7. Apparatus in accordance with claim 6, wherein the output of said means for detecting the position of said feeler means is recorded simultaneously at the earth's surface with the modulated intensity of gamma radiation received by said detecting means.

8. Apparatus in accordance with claim 5, wherein said induction coil current is periodically reversed to extend and retract said arm member and means for automatically wiping said knife edge as said arm member is extended and retracted through said mud cake to prevent build-up of the mud cake on said rotatable wheel and to prevent cushioning of said knife edge as it rides along the sidewall of said well bore.

References Cited by the Examiner
UNITED STATES PATENTS

| 2,369,672 | 2/1945 | Hare | 250—83.6 |
| 2,711,482 | 6/1955 | Goodman | 250—71.5 X |
| 2,761,977 | 9/1956 | McKay | 250—83.6 |
| 2,769,918 | 11/1956 | Tittle | 250—71.5 X |
| 2,882,417 | 4/1959 | Johnson | 250—83.6 X |
| 2,944,148 | 7/1960 | Johnson et al. | 250—71.5 |
| 2,993,994 | 7/1961 | Herzog | 250—83.3 |

RALPH G. NILSON, *Primary Examiner.*

A. R. BORCHELT, *Assistant Examiner.*